(12) United States Patent
Tsou et al.

(10) Patent No.: US 11,643,529 B2
(45) Date of Patent: May 9, 2023

(54) GRAFT POLYMERS FOR DISPERSING GRAPHENE AND GRAPHITE

(71) Applicant: ExxonMobil Chemical Patents Inc., Baytown, TX (US)

(72) Inventors: Andy H. Tsou, Houston, TX (US); Hillary L. Passino, Houston, TX (US)

(73) Assignee: ExxonMobil Chemical Patents Inc., Baytown, TX (US)

(*) Notice: Subject to any disclaimer, the term of this patent is extended or adjusted under 35 U.S.C. 154(b) by 677 days.

(21) Appl. No.: 16/491,367

(22) PCT Filed: Jan. 26, 2018

(86) PCT No.: PCT/US2018/015366
§ 371 (c)(1),
(2) Date: Sep. 5, 2019

(87) PCT Pub. No.: WO2018/164776
PCT Pub. Date: Sep. 13, 2018

(65) Prior Publication Data
US 2020/0017664 A1    Jan. 16, 2020

Related U.S. Application Data

(60) Provisional application No. 62/469,674, filed on Mar. 10, 2017.

(30) Foreign Application Priority Data

Apr. 26, 2017 (EP) ..................... 17168099

(51) Int. Cl.
| | | |
|---|---|---|
| C08L 15/02 | (2006.01) | |
| C08F 210/10 | (2006.01) | |
| C08K 3/04 | (2006.01) | |
| C08J 3/22 | (2006.01) | |
| B60C 1/00 | (2006.01) | |

(52) U.S. Cl.
CPC ............ *C08L 15/02* (2013.01); *B60C 1/0008* (2013.01); *C08F 210/10* (2013.01); *C08J 3/226* (2013.01); *C08K 3/042* (2017.05); *C08F 2800/20* (2013.01); *C08F 2810/50* (2013.01); *C08K 2201/011* (2013.01); *C08L 2201/22* (2013.01); *C08L 2310/00* (2013.01)

(58) Field of Classification Search
CPC .. C08L 15/02; C08L 2310/00; C08L 2201/22; C08F 210/10; C08F 2810/50; C08F 2800/20; C08K 3/042; C08K 2201/011; C08J 3/226; B60C 1/0008
See application file for complete search history.

(56) References Cited

U.S. PATENT DOCUMENTS

| | | | |
|---|---|---|---|
| 5,665,183 A | | 9/1997 | Kresge et al. |
| 5,824,717 A | * | 10/1998 | Merrill ................ C08G 81/021 522/81 |
| 7,906,600 B2 | | 3/2011 | Waddell et al. |
| 7,923,491 B2 | | 4/2011 | Weng et al. |
| 8,110,026 B2 | | 2/2012 | Prud'Homme et al. |
| 9,914,817 B2 | | 3/2018 | Tsou et al. |
| 2006/0229404 A1 | | 10/2006 | Lechtenboehmer |
| 2010/0036023 A1 | * | 2/2010 | Weng ................... B60C 1/0008 977/734 |
| 2012/0164031 A1 | | 6/2012 | Serban et al. |
| 2017/0088688 A1 | * | 3/2017 | Tsou ..................... C08K 3/046 |
| 2019/0047325 A1 | | 2/2019 | Tsou et al. |

FOREIGN PATENT DOCUMENTS

| | | |
|---|---|---|
| EP | 0344021 A | 11/1989 |
| WO | 2008/042025 A | 4/2008 |

OTHER PUBLICATIONS

Gusev et al., "Rational Design of Nanocomposites for Barrier Applications", Adv. Mater., vol. 13, pp. 1641-1643, 2001.
Nielsen, "Models for the Permeability of Filled Polymer Systems", J. Macromol. Sci. (Chem.), vol. A1, No. 5, pp. 929-942, 1967.

* cited by examiner

*Primary Examiner* — Robert D Harlan

(57) ABSTRACT

Disclosed herein are graft polymers having a copolymer backbone and polycyclic aromatic hydrocarbon branches for use as a nanofiller dispersant and methods for making the same. Also disclosed are elastomeric nanocomposite compositions comprising a halobutyl rubber matrix, nanoparticles of graphite or grapheme, and the graft polymer. Such elastomeric nanocomposite compositions are suitable as tire innerliners or innertubes.

7 Claims, No Drawings

GRAFT POLYMERS FOR DISPERSING GRAPHENE AND GRAPHITE

CROSS-REFERENCE OF RELATED APPLICATION

This application is a National Phase Application of PCT Application Ser. No. PCT/US2018/015366, filed Jan. 26, 2018, which claims the benefit of Provisional Application No. 62/469,674, filed Mar. 10, 2017 and European Application No. 17168099.4, filed Apr. 26, 2017, the disclosures of which are incorporated herein by their reference.

FIELD OF THE INVENTION

The present invention relates to graft polymers having a copolymer backbone and polyaromatic hydrocarbon branches for use as a graphite or graphene dispersant in elastomeric nanocomposite compositions.

BACKGROUND OF THE INVENTION

Halobutyl rubbers, which are halogenated isobutylene/isoprene copolymers, are the polymers of choice for best air retention in tires for passenger, truck, bus, and aircraft vehicles. Bromobutyl rubber, chlorobutyl rubber, and halogenated star-branched butyl rubbers can be formulated for specific tire applications, such as tubes or innerliners. The selection of ingredients and additives for the final commercial formulation depends upon the balance of the properties desired, namely, processability and tack of the green (uncured) compound in the tire plant versus the in-service performance of the cured tire composite. Examples of halobutyl rubbers are bromobutyl (brominated isobutylene-isoprene rubber or BIIR), chlorobutyl (chlorinated isobutylene-isoprene rubber or CIIR), star-branched butyl (SBB), Exxpro™ elastomers (brominated isobutylene-co-p-methylstyrene) copolymer (otherwise known as BIMSM), etc.

For rubber compounding applications, traditional small sub-micron fillers such as carbon black and silica are added to halobutyl rubbers to improve fatigue resistance, fracture toughness and tensile strength. More recently, methods to alter product properties and improve air barrier properties in halobutyl rubbers have been developed that comprise adding nanofillers apart from these traditional fillers to the elastomer to form a "nanocomposite." Nanocomposites are polymer systems containing inorganic particles with at least one dimension in the nanometer range (see, for example, WO 2008/042025).

Common types of inorganic particles used in nanocomposites are phyllosilicates, an inorganic substance from the general class of so called "nanoclays" or "clays" generally provided in an intercalated form wherein platelets or leaves of the clay are arranged in a stack in the individual clay articles with interleaf spacing usually maintained by the insertion of another compound or chemical species between the adjacent lamellae. Ideally, intercalation inserts into the space or gallery between the clay surfaces. Ultimately, it is desirable to have exfoliation, wherein the polymer is fully dispersed with the individual nanometer-size clay platelets.

The extents of dispersion, exfoliation, and orientation of platy nanofillers such as organosilicates, mica, hydrotalcite, graphitic carbon, etc., strongly influence the permeability of the resulting polymer nanocomposites. The barrier property of a polymer in theory is significantly improved, by an order of magnitude, with the dispersion of just a few volume percent of exfoliated high aspect-ratio platy fillers, due simply to the increased diffusion path lengths resulting from long detours around the platelets. Nielsen, *J. Macromol. Sci.* (Chem.), vol. A1, p. 929 (1967), discloses a simple model to determine the reduction in permeability in a polymer by accounting for the increase in tortuosity from impenetrable, planarly oriented platy fillers. Gusev et al., *Adv. Mater.*, vol. 13, p. 1641 (2001), discloses a simple stretched exponential function relating the reduction of permeability to aspect ratio times volume fraction of the platy filler that correlates well with permeability values numerically simulated by direct three-dimensional finite element permeability calculations.

To maximize the effect of aspect ratio on permeability reduction, it is therefore useful to maximize the degree of exfoliation and dispersion of the platelets, which are generally supplied in the form of an intercalated stack of the platelets. However, in isobutylene polymers, dispersion and exfoliation of platy nanofillers requires sufficient favorable enthalpic contributions to overcome entropic penalties. As a practical matter, it has thus proven to be very difficult to disperse ionic nanofillers such as clay into generally inert, nonpolar, hydrocarbon elastomers. The prior art has, with limited success, attempted to improve dispersion by modification of the clay particles, by modification of the rubbery polymers, by the use of dispersion aids, and by the use of various blending processes.

Due to the difficulties encountered in dispersing ionic nanoclays in nonpolar elastomers, graphitic carbon has been explored as an alternative platy nanofiller. For example, elastomeric compositions comprising graphite nanoparticles are described in U.S. Pat. No. 7,923,491.

U.S. Publication No. 2006-0229404 discloses a method for making compositions of an elastomer with exfoliated graphite in which the diene monomers are polymerized in the presence of 10 phr or more exfoliated graphite so that the graphite is intercalated with the elastomer. U.S. Pat. No. 8,110,026 describes a process for producing a functional graphene sheet (FGS) based on exfoliation of oxidized graphite suitable for a high degree of dispersion in a polymer matrix for use in a nanocomposite.

Nano graphene platelets (NGPs) obtained through rapid expansion of graphite have become commercially available as of late. These NGPs have graphitic surfaces, as opposed to graphene oxide platelets of oxidized graphitic surfaces, and are quite compatible with hydrocarbon based non-polar butyl halobutyl rubbers. However, a high degree of exfoliation and dispersion of NGPs without agglomerations and aggregations cannot be achieved by solid compounding or solution mixing of these nanoparticles into halobutyl rubbers.

U.S. Patent Publication No. 2017/0088688 relates to nanofiller dispersants comprising the reaction product of a halogenated copolymer comprising units derived from isoolefins having from 4 to 7 carbons and a para-alkylstyrene, and at least one polycyclic aromatic hydrocarbon through an etherification reaction via a benzyl halogenated compound to attach fused aromatic rings to the polymer backbone. U.S. Provisional Application No. 62/356,248 filed on Jun. 29, 2016 relates to nanofiller dispersants comprising graft copolymers having a polyaromatic hydrocarbon backbone and polyaliphatic hydrocarbon branches. There remains a need, however, for improving the dispersion of graphite and graphene nanofillers in elastomeric nanocomposite compositions comprising halobutyl rubbers useful for tires, air barriers, among other things requiring air retention, in order to improve the air impermeability of those compositions.

SUMMARY OF THE INVENTION

The present invention fulfills the need for improved dispersion of graphite and graphene nanofillers in elastomeric nanocomposite compositions by providing graft polymers that function as a graphite and graphene nanofiller dispersant useful in isobutylene-based elastomer/nanofiller nanocomposite compositions. The resulting nanocomposite compositions comprising the graft polymers have improved air barrier properties and are suitable for use as a tire innerliner or innertube. Generally, the graft polymers have a copolymer backbone comprising units derived from an isoolefin having from 4 to 7 carbons and an alkylstyrene, and one or more branches comprising a polycyclic aromatic hydrocarbon. Typically, the one or more branches are directly bonded to an aromatic moiety of the copolymer backbone.

The invention further relates to methods for producing these graft polymers and elastomeric nanocomposite compositions comprising the produced graft polymer. Preferably, the graft polymers are produced by contacting (i) at least one copolymer comprising units derived from an isoolefin having from 4 to 7 carbons and an alkylstyrene and (ii) at least one acyl halide and/or acid anhydride functionalized polyaromatic hydrocarbon with a catalyst, preferably a Lewis acid, at a temperature of about 80° C. to about 200° C. Preferably, an elastomeric nanocomposite composition comprising the graft polymer is produced by combining the graft polymer with (i) at least one halogenated elastomer component comprising units derived from an isoolefin having from 4 to 7 carbons, preferably wherein the elastomer component comprises units derived from at least one multiolefin, and (ii) at least one nanofiller.

DETAILED DESCRIPTION OF THE PREFERRED EMBODIMENTS

Described herein are graft polymers having a copolymer backbone comprising units derived from an isoolefin having from 4 to 7 carbons and an alkylstyrene, and one or more branches comprising a polycyclic aromatic hydrocarbon, useful as a nanofiller dispersant in isobutylene-based elastomer/nanofiller nanocomposite compositions. The nanocomposite composition can include a halogenated isobutylene-based elastomer and a nanofiller, desirably either graphite or graphene, suitable for use as an air barrier. The nanocomposite composition has improved air barrier properties and is suitable for use as a tire innerliner or innertube.

Definitions

As used herein, "polymer" may be used to refer to homopolymers, copolymers, interpolymers, terpolymers, etc. Likewise, a copolymer may refer to a polymer comprising at least two monomers, optionally with other monomers. As used herein, when a polymer is referred to as "comprising" a monomer, the monomer is present in the polymer in the polymerized form of the monomer or in the derivative form of the monomer. Likewise, when catalyst components are described as comprising neutral stable forms of the components, it is well understood by one skilled in the art, that the ionic form of the component is the form that reacts with the monomers to produce polymers. As used herein, the term "graft polymer" refers to a polymer having an identifiable backbone polymer chain and one or more branches bonded thereto, wherein the branches are chemically distinct from the backbone polymer chain.

As used herein, "elastomer" or "elastomeric composition" refers to any polymer or composition of polymers (such as blends of polymers) consistent with the ASTM D1566 definition. Elastomer includes mixed blends of polymers such as melt mixing and/or reactor blends of polymers. The terms may be used interchangeably with the term "rubber".

As used herein, "nanoparticle" or "nanofiller" refers to an inorganic particle with at least one dimension (length, width, or thickness) of less than 100 nanometers.

As used herein, "elastomeric nanocomposite" or "elastomeric nanocomposite composition" refers to any elastomer or elastomeric composition further comprising nanofiller and, optionally, a thermoplastic resin.

As used herein, "phr" is parts per hundred rubber and is a measure common in the art, wherein components of a composition are measured relative to a major elastomer component, based upon 100 parts by weight of the elastomer(s) or rubber(s).

As used herein, "compounding" refers to combining an elastomeric nanocomposite composition with other ingredients apart from nanofiller, nanofiller dispersant, and thermoplastic resin. These ingredients may include additional fillers, curing agents, processing aids, accelerators, etc.

As used herein, "isobutylene-based elastomer" or "isobutylene-based polymer" or "isobutylene-based rubber" refers to elastomers or polymers comprising at least 70 mole percent isobutylene.

As used herein, "isoolefin" refers to any olefin monomer having at least one olefinic carbon having two substitutions on that carbon.

As used herein, "multiolefin" refers to any monomer having two or more double bonds, for example, a multiolefin may be any monomer comprising two conjugated double bonds such as a conjugated diene such as isoprene.

As used herein, "exfoliation" refers to the separation of individual layers of the original inorganic particle, so that polymer can surround or surrounds each separated particle. Preferably, sufficient polymer or other material is present between each platelet such that the platelets are randomly spaced. For example, some indication of exfoliation or intercalation may be a plot showing no X-ray lines or larger d-spacing because of the random spacing or increased separation of layered platelets. However, as recognized in the industry and by academia, other indicia may be useful to indicate the results of exfoliation such as permeability testing, electron microscopy, atomic force microscopy, etc.

The term "aspect ratio" is understood to mean the ratio of the larger dimension of the leaves or platelets of nanofiller, to the thickness of the individual leaf or of the agglomerate or stack of leaves or platelets. The thickness of the individual leaf/platelet can be determined by crystallographic analysis techniques, whereas the larger dimension of a leaf/platelet are generally determined by analysis by transmission electron microscopy (TEM), both of which are known in the art.

The term "average aspect ratio" refers to the volume average aspect ratio, i.e., the third moment of the aspect ratio distribution, unless otherwise indicated.

As used herein, "solvent" refers to any substance capable of dissolving another substance. When the term solvent is used it may refer to at least one solvent or two or more solvents unless specified. The solvent can be polar. Alternatively, the solvent can be non-polar.

As used herein, "solution" refers to a uniformly dispersed mixture at the molecular level or ionic level, of one or more substances (solute) in one or more substances (solvent). For example, solution process refers to a mixing process that both the elastomer and the modified layered filler remain in the same organic solvent or solvent mixtures.

As used herein, "hydrocarbon" refers to molecules or segments of molecules containing primarily hydrogen and carbon atoms. Hydrocarbon also includes halogenated versions of hydrocarbons and versions containing heteroatoms as discussed in more detail below.

As used herein, "polycyclic aromatic hydrocarbon" refers to hydrocarbon compounds containing multiple aromatic rings.

As used herein, "polynuclear aromatic hydrocarbon" refers to a polycyclic aromatic hydrocarbon molecule having fused aromatic rings that share one or more sides.

Graft Polymer Nanofiller Dispersant

The graft polymer nanofiller dispersants useful herein generally comprise (or consist essentially of, or consist of) (a) a copolymer backbone comprising units derived from an isoolefin having from 4 to 7 carbons and an alkylstyrene, and (b) one or more branches comprising a polycyclic aromatic hydrocarbon. Preferably, the one or more branches are directly bonded to an aromatic moiety of the copolymer backbone. More preferably, the one or more branches are covalently bound to the aromatic moiety of the copolymer backbone via a ketone group. Often, the graft polymers comprise the reaction product of (a) a copolymer comprising units derived from an isoolefin having from 4 to 7 carbons and an alkylstyrene, and (b) an acyl halide and/or acid anhydride functionalized polycyclic aromatic hydrocarbon. The resulting graft polymers are useful for dispersing graphite or graphene nanoparticles in a halobutyl matrix based elastomeric nanocomposite. Without wishing to be bound by theory, it is believed that the graft polymers herein operate as a graphite or graphene nanofiller dispersant by preferentially attaching to graphite or graphene surfaces through phi-phi* interaction between the aromatic rings of the polycyclic aromatic hydrocarbon and the graphitic surface of the graphite or graphene nanoparticles.

The synthesis of the graft polymers generally utilizes mild catalytic Friedel-Crafts acylation reactions. It has been found that acyl halide and/or acid anhydride functionalized polycyclic aromatic hydrocarbons can be easily grafted onto the copolymer backbone. Specifically, acyl halide and acid anyhydride functional groups are a good precursor for carbocation, which acts as an electrophile, under a Brønsted or Lewis acid catalyst. In addition, the arene groups of the copolymer backbone act as nucleophiles in the Friedel-Crafts acylation reactions.

The preparation of the graft polymers via the Friedel-Crafts acylation reaction between (a) a copolymer comprising units derived from an isoolefin having from 4 to 7 carbons and an alkylstyrene, and (b) an acyl halide and/or acid anhydride functionalized polycyclic aromatic hydrocarbon will now be described in more detail. The invention is not limited to these aspects, and this description is not meant to foreclose other aspects within the broader scope of the invention, for example, where the graft polymers are prepared through an alternative transformation route.

Copolymer Backbone

In any embodiment, the graft polymers may comprise a copolymer backbone of an isoolefin having from 4 to 7 carbon atoms and a para-alkylstyrene having the formula:

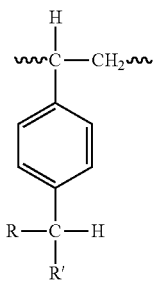

wherein R and R' are independently selected from the group consisting of hydrogen, alkyl preferably having from 1 to 5 carbon atoms, primary haloalkyl, secondary haloalkyl preferably having from 1 to 5 carbon atoms, and mixtures thereof. Preferred copolymers satisfying Formula (I) include copolymers of an isomonoolefin having from 4 to 7 carbon atoms and a para-alkylstyrene, such as those described in European Application No. 89305395.9 filed May 26, 1989, (Publication No. 0344021 published Nov. 29, 1989). Most useful of such copolymer materials are elastomeric random interpolymers of isobutylene and from about 0.5 to about 20 wt %, preferably from about 1 to about 20 wt %, more preferably from about 2 to about 20 wt %, alkylstyrene, preferably para-methylstyrene. These interpolymers are termed "poly(isobutylene-co-p-methylstyrene)", abbreviated as IMSM, and are used as precursors for commercially available Exxpro™ elastomers (ExxonMobil Chemical Company, Houston, Tex.).

Suitable copolymers preferably have a substantially homogeneous compositional distribution such that at least about 95% by weight of the polymer has a para-alkylstyrene content within about 10% of the average para-alkylstyrene content of the polymer. More preferred copolymers are also characterized by a narrow molecular weight distribution (Mw/Mn) of less than about 5, more preferably less than about 3.5, a preferred viscosity average molecular weight in the range of from about 200,000 up to about 2,000,000 and a preferred number average molecular weight in the range of from about 25,000 to about 750,000. In addition, the inter-compositional distribution of suitable copolymers is also substantially homogeneous. That is, these copolymers are essentially random copolymers, and in any particular polymer chain the para-alkylstyrene and isoolefin units will be essentially randomly distributed throughout that chain.

Various methods may be used to produce suitable copolymers, such as those described in European Application No. 89305395.9. Preferred copolymers of isomonoolefins and para-alkylstyrene may be produced by admixing the isomonoolefin and the para-alkylstyrene in a copolymerization reactor under copolymerization conditions in the presence of a diluent and a Lewis acid catalyst.

Polycyclic Aromatic Hydrocarbon

Preferred polycyclic aromatic hydrocarbons are polynuclear aromatic hydrocarbons (PNAs), that is molecules having fused aromatic rings that share one or more sides. More specifically, preferred PNAs have from 2 to 12 fused aromatic rings, such as naphthalenes, anthracenes, phenanthrenes, pyrenes, benzopyrenes, coronenes, and ovalenes. Generally, the polycyclic aromatic hydrocarbon includes a functional group. Suitable functional groups include, but are not limited to acyl halides, particularly acyl chlorides, and acid anhydrides.

The amount of the polycyclic aromatic hydrocarbon can be selected based on the desired amount of grafting with the copolymer backbone. Preferably, the molar ratio of the polycyclic aromatic hydrocarbon to the total aromatic moiety of the copolymer backbone ranges from about 0.5 to about 2.0, more preferably from about 0.8 to about 1.5. Preferably, the amount of grafting of the polycyclic aromatic hydrocarbon with the copolymer backbone, corresponding to the percentage of the total aromatic moiety in the copolymer backbone that bonds with the polycyclic aromatic hydrocarbon, ranges from about 1% to about 80%, preferably from about 5% to about 75%, more preferably from about 10% to about 70%.

Friedel-Crafts Acylation

A graft polymer of the preferred composition can be synthesized by Friedel-Crafts acylation of an aromatic moiety of the copolymer backbone with acyl halide and/or acid anhydride functionalized polycyclic aromatic hydrocarbons in a solution or solid state (such as in extruder) reaction.

The reaction between the copolymer backbone and functionalized polycyclic aromatic hydrocarbons is preferably facilitated with a catalyst at a temperature within the range from about 80° C. or about 100° C., to about 140° C., or about 160° C., or about 180° C., or about 200° C. The catalyst employed is generally acidic, and may be homogeneous or heterogeneous. Examples of suitable acidic heterogeneous catalysts include silico-aluminates (e.g., zeolites, alumina, and silico-alumino-phosphate), sulfated zirconia, transition metal oxides (e.g., titania, zirconia, and niobia oxides), sulfonated polystyrene, solid phosphoric acid, niobic acid, and heteropolyoxometallates. Especially preferred catalysts are Lewis acids. Suitable Lewis acids include methanesulfonic acid (MSA), $AlCl_3$, $FeCl_3$, $GaCl_3$, $BF_3$, $SbCl_5$, $BiCl_3$ $Bi(OTf)_3$, and trifluoromethanesulfonic acid (triflic acid). Preferably, the copolymer backbone and polycyclic aromatic hydrocarbons are reacted in solution. Suitable solvents include high boiling saturated aliphatic hydrocarbons ($C_8$ to $C_{20}$), halogenated aliphatic hydrocarbons ($C_1$ to $C_8$), aryl hydrocarbons ($C_6$ to $C_{20}$), and halogenated aryl hydrocarbons ($C_6$ to $C_{20}$). Particularly preferred solvents include dodecane, toluene, xylenes, and ortho-dichloro benzene (oDCB).

A representative Friedel-Crafts acylation reaction between the copolymer backbone and a polycyclic aromatic hydrocarbon having a suitable functional group is shown by the reaction between IMSM and naphthalic anhydride below:

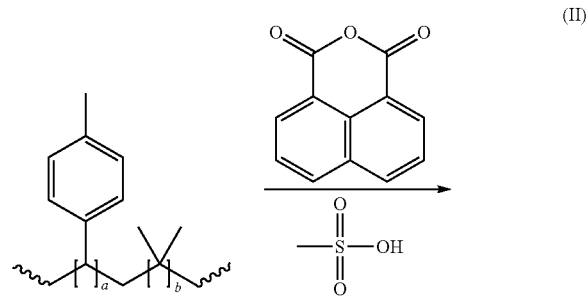

(II)

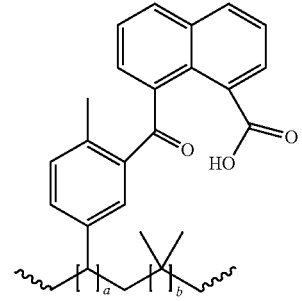

-continued wherein a and b each represent a polymeric unit that is repeated within the copolymer backbone.

Elastomeric Nanocomposite

The uncompounded elastomeric nanocomposite composition can include up to about 45 wt % of the graft polymer nanofiller dispersant based on the weight of the uncompounded nanocomposite composition (i.e., based on the total weight of graft polymer, elastomer, nanofiller, and optional thermoplastic resin). The uncompounded elastomeric nanocomposite composition can contain from about 0.5 to 45 wt % of the graft polymer, preferably from about 2 to about 35 wt %, more preferably from about 4 to about 30 wt %, and ideally from about 5 to about 25 wt %.

In addition to the graft polymer nanofiller dispersant, the elastomeric nanocomposite composition includes at least one additional elastomer component and at least one nanofiller component. Optionally, the elastomeric nanocomposite composition further includes one or more thermoplastic resins. Optionally, the elastomeric nanocomposite composition is compounded and further includes some or all of the following components: processing aids, additional fillers, and curing agents/accelerators.

Elastomer Component

The elastomer component or parts thereof is halogenated. Preferred halogenated rubbers include bromobutyl rubber, chlorobutyl rubber, brominated copolymers of isobutylene and para-methylstyrene, and mixtures thereof. Halogenated butyl rubber is produced by the halogenation of butyl rubber product. Halogenation can be carried out by any means, and the invention is not herein limited by the halogenation process. Often, the butyl rubber is halogenated in hexane diluent at from 4 to 60° C. using bromine ($Br_2$) or chlorine ($Cl_2$) as the halogenation agent. The halogenated butyl rubber has a Mooney Viscosity of from about 20 to about 80 (ML 1+8 at 125° C.), or from about 25 to about 60. The halogen wt % is from about 0.1 to about 10 wt % based on the weight of the halogenated butyl rubber, or from about 0.5 to about 5 wt %. Preferably, the halogen wt % of the halogenated butyl rubber is from about 1 to about 2.5 wt %.

A suitable commercial halogenated butyl rubber is Bromobutyl 2222 (ExxonMobil Chemical Company). Its Mooney Viscosity is from 27 to 37 (ML 1+8 at 125° C., ASTM 1646, modified), and the bromine content is from 1.8 to 2.2 wt % relative to the Bromobutyl 2222. Further, cure characteristics of Bromobutyl 2222 are as follows: MH is from 28 to 40 dN·m, ML is from 7 to 18 dN·m (ASTM D2084). Another commercial example of the halogenated butyl rubber is Bromobutyl 2255 (ExxonMobil Chemical Company). Its Mooney Viscosity is from 41 to 51 (ML 1+8 at 125° C., ASTM D1646), and the bromine content is from 1.8 to 2.2 wt %. Further, cure characteristics of Bromobutyl 2255 are as follows: MH is from 34 to 48 dN·m, ML is from 11 to 21 dN·m (ASTM D2084).

The elastomer can include a branched or "star-branched" halogenated butyl rubber. The halogenated star-branched butyl rubber ("HSBB") often includes a composition of a butyl rubber, either halogenated or not, and a polydiene or block copolymer, either halogenated or not. The invention is not limited by the method of forming the HSBB. The polydienes/block copolymer, or branching agents (hereinafter "polydienes"), are typically cationically reactive and are present during the polymerization of the butyl or halogenated butyl rubber, or can be blended with the butyl or halogenated butyl rubber to form the HSBB. The branching agent or polydiene can be any suitable branching agent, and the invention is not limited to the type of polydiene used to make the HSBB.

The HSBB can be a composition of the butyl or halogenated butyl rubber as described above and a copolymer of a polydiene and a partially hydrogenated polydiene selected from the group including styrene, polybutadiene, polyisoprene, polypiperylene, natural rubber, styrene-butadiene rubber, ethylene-propylene diene rubber, styrene-butadiene-styrene and styrene-isoprene-styrene block copolymers. These polydienes are present, based on the monomer wt %, in an amount greater than about 0.3 wt %, or from about 0.3 to about 3 wt %, or from about 0.4 to about 2.7 wt %.

A commercial example of the HSBB is Bromobutyl 6222 (ExxonMobil Chemical Company), having a Mooney Viscosity (ML 1+8 at 125° C., ASTM D1646) of from 27 to 37, and a bromine content of from 2.2 to 2.6 wt % relative to the HSBB. Further, cure characteristics of Bromobutyl 6222 are as follows: MH is from 24 to 38 dN·m, ML is from 6 to 16 dN·m (ASTM D2084).

The elastomer component can be an isoolefin copolymer comprising a halomethylstyrene derived unit. The halomethylstyrene unit can be an ortho-, meta-, or para-alkyl-substituted styrene unit. The halomethylstyrene derived unit can be a p-halomethylstyrene having at least about 80%, more preferably at least about 90% by weight of the para-isomer. The "halo" group can be any halogen, desirably chlorine or bromine. The halogenated elastomer may also include functionalized interpolymers wherein at least some of the alkyl substituents groups present in the styrene monomer units contain benzylic halogen or some other functional group described further below. These interpolymers are herein referred to as "isoolefin copolymers comprising a halomethylstyrene derived unit" or simply "isoolefin copolymer".

The isoolefin of the copolymer can be a $C_4$ to $C_{12}$ compound, non-limiting examples of which are compounds such as isobutylene, isobutene, 2-methyl-1-butene, 3-methyl-1-butene, 2-methyl-2-butene, 1-butene, 2-butene, methyl vinyl ether, indene, vinyltrimethylsilane, hexene, and 4-methyl-1-pentene. The copolymer can also further include one or more multiolefin derived units. The multiolefin can be a $C_4$ to $C_{14}$ multiolefin such as isoprene, butadiene, 2,3-dimethyl-1,3-butadiene, myrcene, 6,6-dimethyl-fulvene, hexadiene, cyclopentadiene, and piperylene, etc. Desirable styrenic monomer derived units that may comprise the copolymer include styrene, methylstyrene, chlorostyrene, methoxystyrene, indene and indene derivatives, and combinations thereof.

Suitable isoolefin copolymers comprising a halomethylstyrene derived unit can be obtained by halogenating the previously described isomonoolefin-alkylstyrene copolymers of the copolymer backbone. The halogen content of the produced halogenated copolymers may range from above zero to about 7.5 wt %, preferably from about 0.1 to about 5.0 wt %. Most useful of such halogenated copolymer materials are elastomeric random interpolymers of isobutylene and from about 0.5 to about 20 mol % alkylstyrene, preferably para-methylstyrene, wherein up to about 60 mol % of the methyl substituent groups present on the benzyl ring contain a bromine or chlorine atom, preferably a bromine atom (p-bromomethylstyrene). These interpolymers are termed "halogenated poly(isobutylene-co-p-methylstyrene)" or "brominated poly(isobutylene-co-p-methylstyrene)," and are commercially available under the name Exxpro™ Elastomers (ExxonMobil Chemical Company, Houston, Tex.).

Halogenation of the isomonoolefin-alkylstyrene copolymers can be carried out in the bulk phase (e.g., melt phase) or either in solution or in a finely dispersed slurry. Bulk halogenation can be effected in an extruder, or other internal mixer, suitably modified to provide adequate mixing and for handling the halogen and corrosive by-products of the reaction. The details of such bulk halogenation processes are set forth in U.S. Pat. No. 4,548,995, which is hereby incorporated by reference.

The elastomer component can include one or more semi-crystalline copolymers (SCC). Semi-crystalline copolymers are described in U.S. Pat. No. 6,326,433. Generally, the SCC is a copolymer of ethylene or propylene derived units and α-olefin derived units, the α-olefin having from 4 to 16 carbon atoms, and can be a copolymer of ethylene derived units and α-olefin derived units, the α-olefin having from 4 to 10 carbon atoms, wherein the SCC has some degree of crystallinity. The SCC can also be a copolymer of a 1-butene derived unit and another α-olefin derived unit, the other α-olefin having from 5 to 16 carbon atoms, wherein the SCC also has some degree of crystallinity. The SCC can also be a copolymer of ethylene and styrene.

The elastomer component can include various amounts of one, two, or more different elastomers. For example, the elastomer component described herein may further comprise a secondary elastomer component selected from the group consisting of natural rubbers, polyisoprene rubber, styrene butadiene rubber (SBR), polybutadiene rubber, isoprene butadiene rubber (IBR), styrene-isoprene-butadiene rubber (SIBR), ethylene-propylene rubber, ethylene-propylene-diene rubber (EPDM), polysulfide, nitrile rubber, propylene oxide polymers, star-branched butyl rubber and halogenated star-branched butyl rubber, brominated butyl rubber, chlorinated butyl rubber, star-branched polyisobutylene rubber, star-branched brominated butyl (polyisobutylene/isoprene copolymer) rubber; and isobutylene/methylstyrene copolymers such as isobutylene/meta-bromomethylstyrene, isobutylene/bromomethylstyrene, isobutylene/chloromethylstyrene, halogenated isobutylene cyclopentadiene, and isobutylene/chloromethylstyrene and mixtures thereof. Preferred compositions described may contain from about 5 to about 100 phr of halogenated butyl rubber, from about 5 to about 95 phr of star-branched butyl rubber, from about 5 to about 95 phr of halogenated star-branched butyl rubber, or from about 5 to about 95 phr of halogenated poly(isobutylene-co-alkylstyrene), preferably halogenated poly(isobutylene-co-p-methylstyrene). For example, the compositions can contain from about 40 to about 100 phr of halogenated poly(isobutylene-co-alkylstyrene), preferably halogenated poly(isobutylene-co-p-methylstyrene), and/or from about 40 to about 100 phr of halogenated star-branched butyl rubber (HSBB).

The uncompounded elastomeric nanocomposite composition can include up to about 99 wt %, e.g., from about 30 to about 99 wt %, of the one or more elastomeric components or elastomers based on the weight of the uncompounded nanocomposite composition (i.e., based on the total weight of graft polymer, elastomer, nanofiller, and optional thermoplastic resin). Preferably, the uncompounded elastomeric nanocomposite composition contains from about 35 to about 90 wt %, or from about 40 to about 85 wt %, or from about 40 to about 80 wt %, or from about 40 to about 60 wt %, of the one or more elastomeric components or elastomers.

Thermoplastic Resin

The elastomeric nanocomposite composition can optionally include one or more thermoplastic resins. Suitable thermoplastic resins include polyolefins, nylons, and other polymers. Suitable thermoplastic resins can be or include resins containing nitrogen, oxygen, halogen, sulfur or other groups capable of interacting with one or more aromatic functional groups such as a halogen or acidic groups.

Suitable thermoplastic resins include polyamides, polyimides, polycarbonates, polyesters, polysulfones, polylactones, polyacetals, acrylonitrile-butadiene-styrene resins (ABS), polyphenyleneoxide (PPO), polyphenylene sulfide (PPS), polystyrene, styrene-acrylonitrile resins (SAN), styrene maleic anhydride resins (SMA), aromatic polyketones (PEEK, PED, and PEKK) and mixtures thereof.

The elastomeric nanocomposite composition can include any of the thermoplastic resins (also referred to as a thermoplastic or a thermoplastic polymer) described above that are formed into dynamically vulcanized alloys. The term "dynamic vulcanization" is used herein to connote a vulcanization process in which the engineering resin and a vulcanizable elastomer are vulcanized under conditions of high shear. As a result, the vulcanizable elastomer is simultaneously crosslinked and dispersed as fine particles of a "micro gel" within the engineering resin matrix. A further description of suitable thermoplastic resins and dynamically vulcanized alloys is available in U.S. Pat. No. 7,923,491, which is hereby incorporated by reference.

The uncompounded elastomeric nanocomposite composition can include up to about 49 wt % thermoplastic resin based on the weight of the uncompounded nanocomposite composition (i.e., based on the total weight of graft polymer, elastomer, nanofiller, and optional thermoplastic resin). The uncompounded elastomeric nanocomposite composition can contain from about 0.5 to about 45 wt %, preferably from about 2 to about 35 wt %, more preferably from about 5 to about 30 wt %, and ideally from about 10 to about 25 wt %, thermoplastic resin.

Nanofillers

The elastomeric nanocomposite composition typically includes nanoparticles of graphite (preferably graphene). The nanoparticles have at least one dimension (length, width or thickness) of less than about 100 nanometers. Alternately, two dimensions (length, width or thickness) are less than about 100 nanometers, alternately all three dimensions (length, width and thickness) are less than about 100 nanometers. Preferably, the nanoparticle is a sheet having a thickness of less than about 100 nanometers and a length and or width that is at least about 10 times greater than the thickness (preferably about 20 to about 500 times, preferably about 30 to about 500 times the thickness). Alternatively, the graphite is pulverized. Useful graphites may have a specific surface area of about 10 to about 2000 $m^2/g$, preferably from about 50 to 1000 $m^2/g$, preferably from about 100 to about 900 $m^2/g$.

Preferably, the uncompounded nanocomposite contains about 0.01 to about 15.0 wt % graphite (preferably graphene) nanoparticles based on the weight of the uncompounded nanocomposite composition (i.e., based on the total weight of graft polymer, elastomer, nanofiller, and optional thermoplastic resin). More preferably, the uncompounded nanocomposite contains about 0.05 to about 10.0 wt % graphite (preferably graphene) nanoparticles. More preferably, the uncompounded nanocomposite contains from about 0.1 wt % to about 10.0 wt %; from about 0.5 wt % to about 10.0 wt %; from about 1.0 wt % to about 10.0 wt % graphite (preferably graphene) nanoparticles. For example, the uncompounded nanocomposite contains from a low of about 0.05 wt %, 0.5 wt % or 1.2 wt % to a high of about 10 wt %, 12.5 wt %, or 15 wt % graphite (preferably graphene) nanoparticles.

Preferably, the graphite (preferably graphene) has up to about 50 wt % present in the beta form, typically from about 5 to about 30 wt %. Alternatively, the graphite (preferably graphene) is present in the alpha form, having typically less than about 1 wt % beta form, preferably about 0 wt % beta form.

The graphite is preferably in the form of nano graphene platelets (NGPs) obtained through rapid expansion of graphite. Expanded graphite can typically be made by immersing natural flake graphite in a bath of acid (such as sulphuric acid, nitric acid, acetic acid, and combinations thereof, or the combination of chromic acid, then concentrated sulfuric acid), which forces the crystal lattice planes apart, thus expanding the graphite.

Preferably, the expandable graphite may have one or more of the following properties (before expansion): a) particle size of 32 to 200 mesh, (alternately a median particle diameter of 0.1 to 500 microns (alternately 0.5 to 350 microns, alternately 1 to 100 microns)), and/or b) expansion ratio of up to 350 cc/g, and/or c) a pH of 2 to 11, (preferably 4 to 7.5, preferably 6 to 7.5). Expandable graphite can be purchased from GRAFTech International or Asbury Carbons, Anthracite Industries, among others. Particularly useful expandable graphite includes GRAFGUARD™ Expandable Graphite Flakes. Expanded graphite can be further milled for the production of NGPs, as described in U.S. Pat. No. 7,550,529, with a thickness ranging from 1 to 20 nanometers and width ranging from 1 to 50 microns. Particularly useful NGPs, or short stacks of graphene sheets, include grades H, M, and C of xGnP® NGPs, commercially available from XG Sciences, Inc., and N008-N, N008-P, and N006-P NGP materials, commercially available from Angstron Materials, Inc.

Preferably, the expandable graphite has an onset temperature (temperature at which it begins to expand) of at least about 160° C. or more, alternately about 200° C. or more, alternately about 400° C. or more, alternately about 600° C. or more, alternately about 750° C. or more, alternately about 1000° C. or more. Preferably the expandable graphite has an expansion ratio of at least about 50:1 cc/g, preferably at least about 100:1 cc/g, preferably at least about 200:1 cc/g, preferably at least about 250:1 cc/g at 600° C. Alternatively, the expandable graphite has an expansion ratio of at least about 50:1 cc/g, preferably at least about 100:1 cc/g, preferably at least about 200:1 cc/g, preferably at least about 250:1 cc/g at 150° C. The graphite may be expanded before it is combined with the other blend components or it may be expanded while blending with other blend components. Often, the graphite is not expanded (or expandable) after formation into an article (such as an air barrier, or a tire innerliner).

Preferably, the graphite is or comprises graphene. Graphene is a one-atom-thick planar sheet of $sp^2$-bonded carbon atoms that are densely packed in a honeycomb crystal lattice. The carbon-carbon bond length in graphene is approximately 1.42 angstroms. Graphene is the basic structural element of graphitic materials including graphite, as graphite can be considered to be many layers of graphene. Graphene can be prepared by micromechanical cleavage of graphite (e.g., removing flakes of graphene from graphite) or by exfoliation of intercalated graphitic compounds. Likewise, graphene fragments can be prepared through chemical modification of graphite. First, microcrystalline graphite is treated with a strongly acidic mixture of sulfuric acid and nitric acid. Then the material is oxidized and exfoliated resulting in small graphene plates with carboxyl groups at their edges. These are converted to acid chloride groups by treatment with thionyl chloride; next, they are converted to the corresponding graphene amide via treatment with octadecylamine. The resulting material (circular graphene layers of 5.3 angstrom thickness) is soluble in tetrahydrofuran, tetrachloromethane, and dichloroethane. (see Niyogi, et al. *Solution Properties of Graphite and Graphene, J. Am. Chem. Soc.*, 128(24), pp. 7720-7721 (2006)).

Alternatively, the graphite is present in the elastomer composition as dispersed nanosheets having a thickness of less than about 100 nanometers, preferably less than about 50 nanometers, preferably less than about 30 nanometers.

Additional Fillers

In addition to the aforementioned nanofillers, the elastomeric nanocomposite composition can be compounded and include one or more non-exfoliating fillers such as calcium carbonate, clay, mica, silica and silicates, talc, titanium dioxide, starch, and other organic fillers such as wood flour, and carbon black. These filler components are typically present at a level of from about 10 to about 200 phr of the compounded composition, more preferably from about 40 to about 140 phr. Preferably, two or more carbon blacks are used in combination, for example, Regal 85 is a carbon black that has multiple particle sizes, rather than just one. Combinations also include those where the carbon blacks have different surface areas. Likewise, two different blacks which have been treated differently may also be used. For example, a carbon black that has been chemically treated can be combined with a carbon black that has not.

The compounded elastomeric nanocomposite can include carbon black having a surface area of less than about 35 $m^2/g$ and a dibutylphthalate oil absorption of less than about 100 $cm^3/100$ g. Carbon blacks can include, but are not limited to, N660, N762, N774, N907, N990, Regal 85, and Regal 90. Table 1 shows properties of useful carbon blacks.

TABLE 1

| Grade | SA ($m^2/g$) | DBP Absorption ($cm^3/100$ g) |
| --- | --- | --- |
| N660 | 34 | 90 |
| N754 | 25 | 58 |
| N762 | 26 | 64 |
| N774 | 28 | 70 |
| N787 | 30 | 80 |
| N907 | 10 | 38 |
| N990 | 7 | 42 |
| N991 | 10 | 38 |
| Regal 85 | 23 | 33 |
| Regal 90 | 23 | 32 |
| ARO 60 | 23 | 58 |
| SL 90 | 25 | 58 |

The carbon black having a surface area of less than about 35 $m^2/g$ and a dibutylphthalate oil absorption of less than about 100 $cm^3/100$ g is typically present in the compounded nanocomposite at a level of from about 10 to about 200 phr, preferably about 20 to about 180 phr, more preferably about 30 to about 160 phr, and more preferably about 40 to about 140 phr.

Curing Agents, Processing Aids, and Accelerators

The compounded elastomeric nanocomposite composition can include one or more other components and cure additives customarily used in rubber mixes, such as pigments, accelerators, cross-linking and curing materials, antioxidants, antiozonants, and fillers. Preferably, processing aids (resins) such as naphthenic, aromatic or paraffinic extender oils can be present from 1 to 30 phr of the compounded composition. Alternatively, naphthenic, aliphatic, paraffinic and other aromatic resins and oils are substantially absent from the composition. By "substantially absent," it is meant that naphthenic, aliphatic, paraffinic, and other aromatic resins are present, if at all, to an extent no greater than 2 phr in the composition.

Generally, polymer compositions, e.g., those used to produce tires, are crosslinked. It is known that the physical properties, performance characteristics, and durability of vulcanized rubber compounds are directly related to the number (crosslink density) and type of crosslinks formed during the vulcanization reaction. (See, e.g., Helt et al., The Post Vulcanization Stabilization for NR, Rubber World 18-23 (1991)). Cross-linking and curing agents include sulfur, zinc oxide, and organic fatty acids. Peroxide cure systems may also be used. Generally, polymer compositions can be crosslinked by adding curative molecules, for example sulfur, metal oxides (i.e., zinc oxide), organometallic compounds, radical initiators, etc., followed by heating. In particular, the following are common curatives that will function in the present invention: ZnO, CaO, MgO, $Al_2O_3$, $CrO_3$, FeO, $Fe_2O_3$, and NiO. These metal oxides can be used in conjunction with the corresponding metal stearate complex (e.g., Zn(Stearate)$_2$, Ca(Stearate)$_2$, Mg(Stearate)$_2$, and Al(Stearate)$_3$), or with stearic acid, and either a sulfur compound or an alkylperoxide compound. (See also, *Formulation Design and Curing Characteristics of NBR Mixes for Seals*, Rubber World 25-30 (1993)). This method can be accelerated and is often used for the vulcanization of elastomer compositions.

Accelerators include amines, guanidines, thioureas, thiazoles, thiurams, sulfenamides, sulfenimides, thiocarbamates, xanthates, and the like. Acceleration of the cure process can be accomplished by adding to the composition an amount of the accelerant. The mechanism for accelerated vulcanization of natural rubber involves complex interactions between the curative, accelerator, activators and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), 4,4'-dithiodimorpholine (DTDM), alkyl disulfides, such as tetrabutylthiuram disulfide (TBTD) and 2,2'-benzothiazyl disulfide (MBTS), hexamethylene-1,6-bisthiosulfate disodium salt dihydrate, 2-(morpholinothio) benzothiazole (MBS or MOR), compositions of 90% MOR and 10% MBTS (MOR 90), N-tertiarybutyl-2-benzothiazole sulfenamide (TBBS), N-oxydiethylene thiocarbamyl-N-oxydiethylene sulfonamide (OTOS), zinc 2-ethyl hexanoate (ZEH), and N,N'-diethyl thiourea.

Preferably, at least one curing agent is present from 0.2 to 15 phr of the compounded composition, or from 0.5 to 10 phr. Curing agents include those components described above that facilitate or influence the cure of elastomers, such as metals, accelerators, sulfur, peroxides, and other agents common in the art, as described above.

Processing

Mixing of the components to form the elastomeric nanocomposite composition and/or compounding of the elastomeric nanocomposite composition can be carried out by combining the components in any suitable internal mixing device such as a Banbury™ mixer, BRABENDER™ mixer, or extruder (e.g., a single screw extruder or twin screw extruder). Mixing can be performed at temperatures up to the melting point of the elastomers and/or rubbers used in the composition at a rate sufficient to allow the graphite and/or graphene to become uniformly dispersed within the polymer to form the nanocomposite.

Suitable mixing rates can range from about 10 RPM to about 8,500 RPM. Preferably, the mixing rate can range from a low of about 10 RPM, 30 RPM, or 50 RPM to a high of about 500 RPM, 2,500 RPM, or 5,000 RPM. More preferably, the mixing rate can range from a low of about 10 RPM, 30 RPM, or 50 RPM to a high of about 200 RPM, 500 RPM, or 1,000 RPM.

The mixing temperature can range from about 40° C. to about 340° C. Preferably, the mixing temperature can range from about 80° C. to 300° C. More preferably, the mixing temperature can range from a low of about 30° C., 40° C., or 50° C. to a high of about 70° C., 170° C., or 340° C. More preferably, the mixing temperature can range from a low of about 80° C., 90° C., or 100° C. to a high of about 120° C., 250° C., or 340° C. Ideally, the mixing temperature can range from a low of about 85° C., 100° C., or 115° C. to a high of about 270° C., 300° C., or 340° C.

Often, about 70% to about 100% of the one or more elastomer components along with the one or more graft polymer nanofiller dispersants can be mixed at a rate noted above for about 20 to about 90 seconds, or until the temperature reaches from about 40° C. to about 60° C. Then, about 75% to about 100% of the nanofiller, and the remaining amount of elastomer and/or nanofiller dispersant, if any, can be added to the mixer, and mixing can continue until the temperature reaches from about 90° C. to about 150° C. Next, any remaining nanofiller and/or additional fillers can be added, as well as processing oil, and mixing can continue until the temperature reaches from about 130° C. to about 190° C., such as from about 140° C. to about 190° C. The finished mixture can then be finished by sheeting on an open mill and allowed to cool to from about 40° C. to about 100° C., such as from about 60° C. to about 100° C., when the curatives are added.

Alternatively, about 75% to about 100% of the one or more graft polymer nanofiller dispersants and about 75% to about 100% of the nanofiller can be mixed, preferably via solution blending. Preferably, the mixing is performed at a temperature ranging from about 50° C. to about 170° C., more preferably from about 90° C. to about 150° C. The resulting mixture can be mixed with about 70% to about 100% of the one or more elastomer components at a rate noted above for about 20 to about 90 seconds, or until the temperature reaches from about 40° C. to about 60° C. Then, the remaining amount of elastomer and/or nanofiller dispersant, if any, can be added to the mixer, and mixing can continue until the temperature reaches from about 90° C. to about 150° C. Next, any remaining nanofiller and/or additional fillers can be added, as well as processing oil, and mixing an continue until the temperature reaches from about 130° C. to about 190° C., such as from about 140° C. to about 190° C. The resulting mixture can then be finished by sheeting on an open mill and allowed to cool to from about 40° C. to about 100° C., such as from about 60° C. to about 100° C., when the curatives are added.

INDUSTRIAL APPLICABILITY

The compositions described herein may be incorporated into articles, such as films, sheets, molded parts and the like. Specifically the compositions described herein may be formed into tires, tires parts (such as sidewalls, treads, tread cap, innertubes, innerliners, apex, chafer, wirecoat, and ply coat), tubes, pipes, barrier films/membranes, or any other application where air impermeability would be advantageous.

Preferably, articles formed from the elastomeric compositions described herein have a permeability of about 180 mm-cc/$M^2$-day or less, preferably about 160 mm-cc/$M^2$-day or less, preferably about 140 mm-cc/$M^2$-day or less, preferably about 120 mm-cc/$M^2$-day or less, preferably about 100 mm-cc/$M^2$-day as determined on a MOCON OX-TRAN 2/61 permeability tester at 40° C. as described below. Preferably, elastomeric nanocomposites comprising an elastomer component, a graft polymer as described herein, and a nanofiller have a permeability at 40° C. of at least about 15% lower, more preferably at least about 20% lower, more preferably at least about 30% lower, and ideally at least about 50% lower than the permeability of the elastomer component in the absence of the graft polymer and nanofiller.

EXAMPLES

The foregoing discussion can be further described with reference to the following non-limiting examples.

Synthesis and Properties of Naphthalic Anhydride Functionalized IMSM (IMSM-g-NA)

Under nitrogen protection, 36 g of IMSM, having 7.5 wt % para-methylstyrene units and Mooney Viscosity of 35±5, and 3.7 g naphthalic anhydride (Sigma Aldrich), were dissolved in 500 mL of anhydrous oDCB (ortho-1,2 dichlorobenzene) (Sigma Aldrich) at 120° C. in a reaction vessel equipped with an overhead mechanical stirrer and a condenser. MSA (methanesulfonic acid) (Sigma Aldrich) was then slowly added up to a total amount of 4.1 g. The temperature in the reaction vessel was increased to reflux oDCB, and the reaction was then run under nitrogen protection for four hours under reflux. The resulting reaction product was precipitated in 3.5 L of methanol (Sigma Aldrich), filtered, washed with fresh methanol, and dried in a vacuum oven at 100° C. until reaching a constant weight.

The synthesized IMSM-g-NA product was characterized by proton nuclear magnetic resonance CH NMR) and compared to the starting material. NMR spectra were acquired using a 500 MHz spectrometer obtained from Agilent Technologies, with 1,1,2,2-tetrachloroethane-$d_2$ (TCE-$d_2$) used as the solvent. From the acquired NMR spectra, it was determined that 15% of the aromatic moiety of the IMSM was grafted with naphthalic anhydride.

Solution Blending of Synthesized IMSM-g-NA with Nano Graphene Platelets

A solution blend of the synthesized IMSM-g-NA with nano graphene platelets (NGPs) was prepared in accordance with the following procedure. 40 g of IMSM-g-NA were first dissolved in 500 mL of oDCB under nitrogen protection in a 1 L 3-neck round bottom flask equipped with a condenser at 120° C. Afterward, 10 g of grade C xGnP™ NGPs having an average surface area of 500 m²/g and a density of from 2-2.25 g/cc, commercially available from XG Sciences, Inc. were added and the components were mixed under reflux for four hours. Next, the mixture was precipitated in 1 L of isopropanol while still warm. The resulting product was filtered and washed with fresh isopropanol and dried in a vacuum oven at 100° C.

Preparation of Samples and Oxygen Permeability Characterization

A series of samples were prepared for oxygen permeability testing. The samples included a neat Bromobutyl 2222 grade BIIR compound copolymer (commercially available from ExxonMobil Chemical Company), blends comprising Bromobutyl 2222 grade BIIR compound copolymer and NGPs in the absence of a nanofiller dispersant, and blends comprising Bromobutyl 2222 grade BIIR compound copolymer with the prepared solution blend of IMSM-g-NA with NGPs.

Each of the samples was compounded by charging the material (36 g total for each sample) into a BRABENDER™ mixer at 135° C. and 60 RPM. After 1 minute, 20 g of N660 Carbon Black (CB) fillers were added. The mixing was then continued for another 6 minutes for a total mix time of 7 minutes. The material was then removed, cut up, and fed back into the BRABENDER™ mixer at 45° C. and 40 RPM. After 1 minute, 0.33 g MBTS (Mercaptobenzothiazole disulfide), 0.33 g zinc oxide, and 0.33 g stearic acid curatives were added. The mixing was then continued for another 3 minutes for a total mix time of 4 minutes.

The compounded materials were pressed in between Teflon sheets and molded/cured at 170° C. for 15 minutes. The resulting cure pads were then used for property measurements and for dispersion characterization. The oxygen permeability values were measured using a MOCON OX-TRAN 2/61 permeability tester at 40° C., 0% RH, and 760 mm Hg.

A first set of tests was performed comparing oxygen permeability values of the neat BIIR compound copolymer with blends comprising the BIIR compound copolymer and NGPs in the absence of a nanofiller dispersant. The results of the oxygen permeability testing, along with the compositional makeup of each sample (given in terms of the uncompounded sample), are summarized in Table 2. The change in permeability values reported in Table 2 were calculated relative to the permeability of sample 1.

TABLE 2

| Example | BIIR (wt %) | NGP (wt %) | Permeability (mm-cc)/ (M²-day) | Change in Permeability (%) |
|---|---|---|---|---|
| 1 (COMPARATIVE) | 100 | 0 | 142 | — |
| 2 (COMPARATIVE) | 99.7 | 0.3 | 168 | +18.3 |
| 3 (COMPARATIVE) | 97 | 3 | 167 | +17.6 |

A second set of tests were performed comparing oxygen permeability values of the neat BIIR compound copolymer with blends comprising the BIIR compound copolymer and the prepared solution blend of IMSM-g-NA with NGPs. The results of the oxygen permeability testing, along with the compositional makeup of each sample (given in terms of the uncompounded sample), are summarized in Table 3. The change in permeability values reported in Table 3 were calculated relative to the permeability of sample 4.

TABLE 3

| Example | BIIR (wt %) | IMSM-NA (wt %) | NGP (wt %) | Permeability (mm-cc)/ (M²-day) | Change in Permeability (%) |
|---|---|---|---|---|---|
| 4 (COMPARATIVE) | 100 | 0 | 0 | 181 | — |
| 5 | 75 | 20 | 5 | 110 | −39.2 |
| 6 | 50 | 40 | 10 | 97 | −46.4 |

As shown in Table 3, the nanocomposites of Examples 4 and 5, each comprising a solution blend of IMSM-g-NA, exhibited a substantial reduction in permeability compared neat BIIR compound copolymer of Comparative Example 4. These results indicate that a high degree of NGP dispersion was achieved in these nanocomposites. In contrast, and as shown in Table 2, nanocomposites of Comparative Examples 2 and 3, each comprising NGPs dispersed without the aid of a nanofiller disersant, resulted in an increase in permeability over the neat BIIR copolymer compound of Comparative Example 1. These results indicate that a low degree of NGP dispersion was achieved in these nanocomposites.

Additional Test Methods

Molecular weights (number average molecular weight (Mn) and weight average molecular weight (Mw) are determined using a Polymer Laboratories Model 220 high temperature GPC-SEC equipped with on-line differential refractive index (DRI), light scattering (LS), and viscometer (VIS) detectors (so called GPC-3D, Gel Permeation Chromatography-3 Detectors). It uses three Polymer Laboratories PLgel 10 m Mixed-B columns for separation using a flow rate of 0.54 ml/min and a nominal injection volume of 300 μL. The detectors and columns are contained in an oven maintained at 135° C. The stream emerging from the size exclusion chromatography (SEC) columns is directed into the miniDAWN (Wyatt Technology, Inc.) optical flow cell and then into the DRI detector. The DRI detector is an integral part of the Polymer Laboratories SEC. The viscometer is inside the SEC oven, positioned after the DRI detector. The details of these detectors, as well as their calibrations referenced to polystyrene, have been described by, for example, T. Sun, P. Brant, R. R. Chance, and W. W. Graessley, in 34(19) MACROMOLECULES, 6812-6820, (2001).

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. For example, the compositions described herein may be free of any component, or composition not expressly recited or disclosed herein. Any method may lack any step not recited or disclosed herein. Likewise, the term "comprising" is considered synonymous with the term "including." And whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A polymer comprising:
    (a) a copolymer backbone comprising units derived from an isoolefin having from 4 to 7 carbons and an alkylstyrene; and
    (b) one or more branches comprising a polycyclic aromatic hydrocarbon, wherein the one or more branches are directly bonded to an aromatic moiety of the copolymer backbone.

2. The polymer of claim 1, wherein the polycyclic aromatic hydrocarbon is polynuclear.

3. The polymer of claim 2, wherein the polycyclic aromatic hydrocarbon is selected from the group consisting of naphthalenes, anthracenes, phenanthrenes, pyrenes, benzopyrenes, coronenes, ovalenes, and combinations thereof.

4. The polymer of claim 1, wherein the copolymer backbone is poly(isobutylene-co-p-methylstyrene) (IMSM).

5. The polymer of claim 1, wherein the one or more branches are covalently bound to the aromatic moiety via a ketone group.

6. The polymer of claim 5, wherein the polymer comprises the reaction product of:
    (a) a copolymer comprising units derived from an isoolefin having from 4 to 7 carbons and an alkylstyrene; and
    (b) an acyl halide and/or acid anhydride functionalized polycyclic aromatic hydrocarbon.

7. A process for using the polymer of claim 1 as a nanofiller dispersant in an elastomeric nanocomposite composition.

* * * * *